D. W. HAWKSWORTH.
CAR ROOF.
APPLICATION FILED JUNE 11, 1910.

1,137,968.

Patented May 4, 1915.

Witnesses

Inventor
David W. Hawksworth
By Whittemore Hulbert & Whittemore
Attys

UNITED STATES PATENT OFFICE.

DAVID W. HAWKSWORTH, OF DETROIT, MICHIGAN, ASSIGNOR TO HUTCHINS CAR ROOFING COMPANY, OF DETROIT, MICHIGAN, A CORPORATION OF MICHIGAN.

CAR-ROOF.

1,137,968.
Specification of Letters Patent.
Patented May 4, 1915.

Application filed June 11, 1910. Serial No. 566,382.

*To all whom it may concern:*

Be it known that I, DAVID W. HAWKSWORTH, a citizen of the United States of America, residing at Detroit, in the county of Wayne and State of Michigan, have invented certain new and useful Improvements in Car-Roofs, of which the following is a specification, reference being had therein to the accompanying drawings.

The invention relates to car roofs and consists in a novel construction of means for bracing the roof frame, as more fully hereinafter described.

Figure 1:
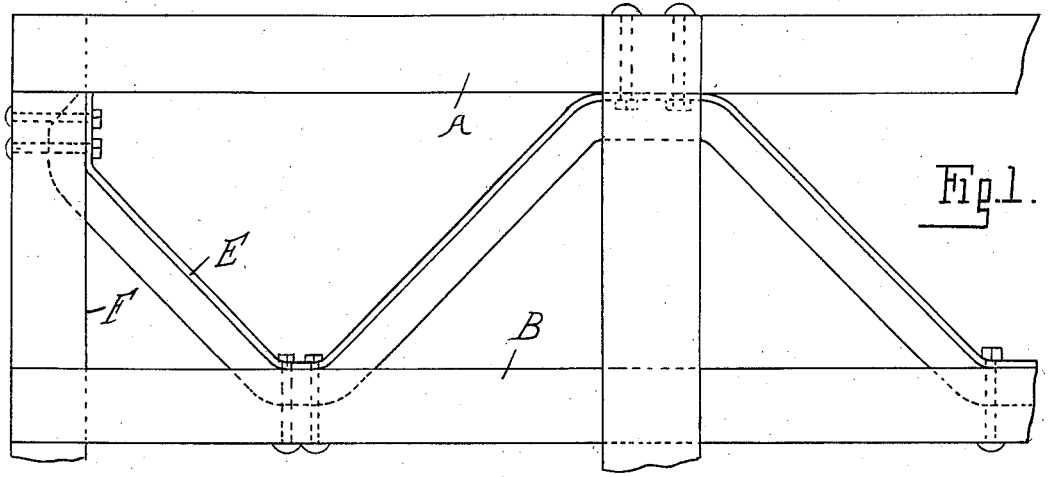
Figure 2:
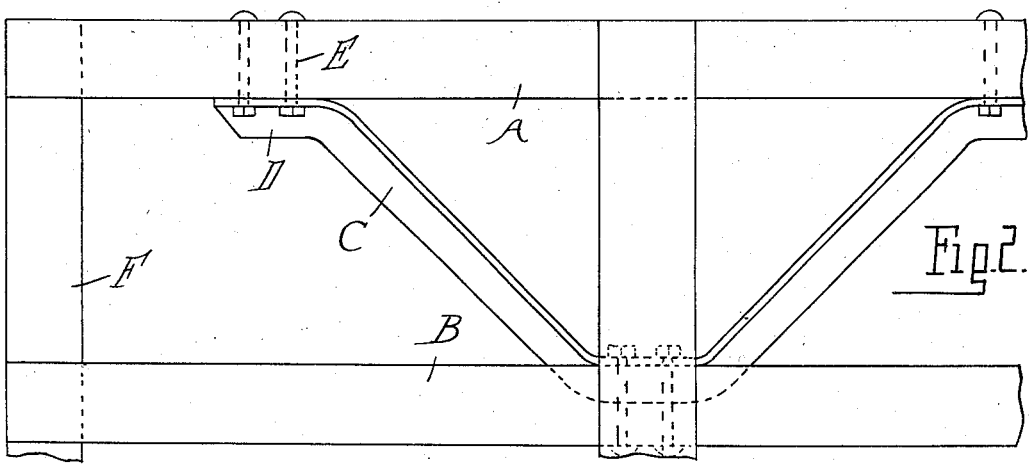
Figure 3:
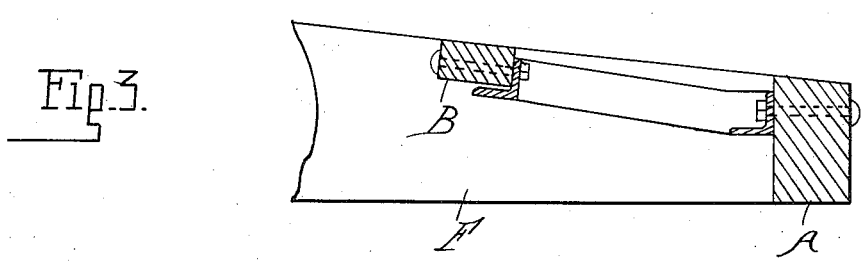

In the drawings Figure 1 is a plan view of the car roof with the roofing plates removed. Fig. 2 is a similar view showing a modified construction. Fig. 3 is a cross section of the construction shown in Fig. 1.

It is particularly the object of the invention to secure greater rigidity in the roof frame by a system of diagonal bracing. This bracing consists of a bar bent to extend in a zig-zag course between the side plate of the car and adjacent purlin being rigidly attached to said plate and purlin, intending to hold the same in parallel relation. As shown, A is the side plate of a car of any suitable construction, and B is a purlin.

C is a brace bar preferably of an angle cross section. This bar is bent to have a securing portion D which lies adjacent to the inner face of the plate A and purlin B and is secured thereto by bolts or rivets E. The bar C is preferably bent to have at least two portions extending at reverse angles but it may be further extended if desired. The securing portions D are in the vertical portion of the angle section, while the horizontal portion of said section lies adjacent to the purlin. Thus the brace does not increase the depth of the roof structure. In the construction shown in Fig. 1 a similarly bent bar C constitutes the brace but this bar is secured at one end, to end plate F of the roof frame and extends first to the purlin and then to the side plate of the car.

With either one of the systems above described, the roof frame is rigidly braced, which will prevent the distortion of the roofing sheets.

What I claim as my invention is:

1. In a car roof, the combination with purlins, of a member of angle cross-section bent to form a diagonal brace with securing portions parallel to the purlins, the vertical flange of the brace being in contact with the vertical face of the purlins and the lateral face extending parallel to and in proximity to the lateral face of the purlin.

2. In a car roof, the combination with a plurality of purlins, of a brace formed of angle bars having a flange overlapping the transverse face of the purlins, and a flange that overlaps the vertical face of the purlins and is secured thereto.

3. In a car roof, the combination with purlins, of a brace member lying substantially in the same plane as the purlins, said brace member being of angle cross-section and bent to form a diagonal brace with securing portions parallel to the purlins, the vertical flange of the brace being in contact with the vertical face of the purlin, and the lateral face extending parallel to and in proximity to the lateral face of the purlin.

In testimony whereof I affix my signature in presence of two witnesses.

DAVID W. HAWKSWORTH.

Witnesses:
W. J. BELKNAP,
JAMES P. BARRY.